May 7, 1935.   L. A. BABCOCK   2,000,370
MILK PASTEURIZER
Filed March 2, 1933
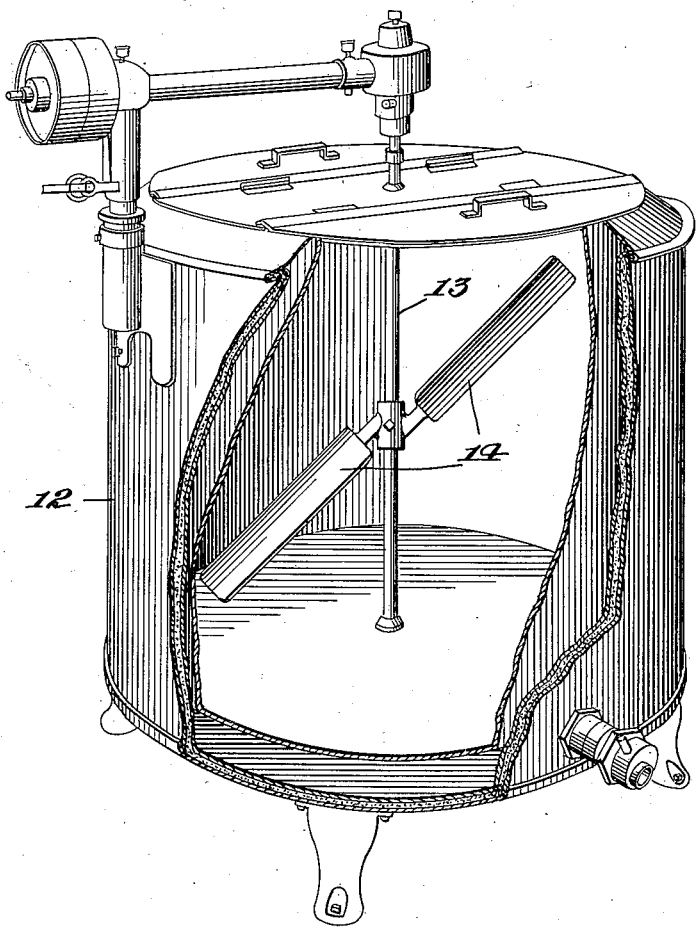
Inventor:
Leo A. Babcock,
by Calvert Rotter
Attys.

Patented May 7, 1935

2,000,370

UNITED STATES PATENT OFFICE 2,000,370

MILK PASTEURIZER

Leo A. Babcock, Cattaraugus, N. Y., assignor to Oakes & Burger Co., a corporation of New York Application March 2, 1933, Serial No. 659,429

1 Claim. (Cl. 259—107)

This invention relates to milk pasteurizers and has for its object to provide an agitator for the milk which will work efficiently at all times and particularly when there is only a comparatively small depth of milk in the pasteurizing tank, as when only a comparatively small quantity of milk is to be pasteurized, or when there is only a small depth of milk in the tank when the tank is being emptied.

In the operation of pasteurizers heretofore in use, and in which the propeller blades are located near the bottoms of the tanks and are disposed horizontally, it has been found that too great an agitation of the milk frequently occurs, particularly when the depth of milk is small. If the agitation is too great the cream layers at the tops of the milk bottles are destroyed, which is objectionable, as such cream layers afford the only visible information to the purchasers that the milk has a proper proportion of butter fat. It has been found, however, that by setting an agitating propeller up higher in the tank, and fixing it in an inclined position of about 45° to a vertical plane, this over-agitation of the milk is avoided, particularly when the depth of milk is small as, under such circumstances, only one part of the agitating propeller will work in the milk, so that the agitation of the milk will be in proportion of the depth of milk in the tank. The inclined agitating propeller will be so arranged that its lower end part extends down to a point near the bottom of the tank. With this arrangement of the agitating propeller the milk being pasteurized will be circulated gently and properly against the heated walls of the tank.

The accompanying drawing is a perspective view of a pasteurizing tank embodying the present invention.

Referring to the drawing, 12 denotes a water-jacketed pasteurizing tank of well-known form and within which is a vertical rotatable shaft 13 driven in the usual manner. Fixed to the shaft 13, about midway of the length thereof, and inclined at an angle of about 45° to said vertical shaft, is the agitating propeller 14 the lower part of which extends down to a point near the bottom of the tank. The propeller or agitating blades 14, as shown in the drawing, are inclined or twisted relative to their plane or path of movement. From this it will be evident that the length of the agitating propeller working in the milk in the tank will be in proportion to the depth of the milk in the tank, so that the milk will be gently circulated against the heated walls of the tank at all depths of milk, as hereinbefore stated, and over-agitation of the milk will thus be avoided. It will be obvious that the twisted blades of the propeller will have a lesser agitating effect than they would have if they were disposed flatwise to a plane or path of movement.

It will be obvious from the foregoing statement of the object of the invention that only a gentle agitation of the milk to be pasteurized is desirable. To this end the agitator consists solely of a single set of twisted and inclined agitating propeller blades one of which extends down to near the bottom of the tank 12 for a proper operation when there is only a small depth of milk in the tank, and the other of which extends up to near the top of the tank, these blades being set at an angle of about 45 degrees to the plane of the vertical shaft to which said blades are fixed, as shown in the drawing, thus adapting the pasteurizer for efficient use with either a small or a large depth of milk in said tank.

Having thus described my invention I claim and desire to secure by Letters Patent:

A milk pasteurizer tank provided with a vertical rotatable shaft to which is fixed, about midway of the length thereof, an agitating propeller consisting solely of a single set of twisted blades arranged at an angle of about 45 degrees to said vertical shaft, one of said blades extending down to a point near the bottom of said tank and the other of said blades extending upward to a point near the top of said tank; whereby the agitation of the milk being pasteurized will be in proportion to the depth of the milk in the tank.

LEO A. BABCOCK.